July 12, 1966  R. H. BARNES  3,260,347
MACHINE FOR ORIENTING SMALL PARTS
Filed Dec. 9, 1963  2 Sheets-Sheet 1

INVENTOR
ROBERT H. BARNES
BY
Larry N. Barger

July 12, 1966  R. H. BARNES  3,260,347
MACHINE FOR ORIENTING SMALL PARTS
Filed Dec. 9, 1963  2 Sheets-Sheet 2

INVENTOR
ROBERT H. BARNES
BY
*Larry N. Barger*

United States Patent Office 3,260,347
Patented July 12, 1966

3,260,347
MACHINE FOR ORIENTING SMALL PARTS
Robert H. Barnes, Burbank, Calif., assignor to Pharmaseal Laboratories, Glendale, Calif., a corporation of California
Filed Dec. 9, 1963, Ser. No. 329,156
13 Claims. (Cl. 198—33)

This invention relates to a machine for orienting small parts and more particularly to a machine for orienting the small stoppers of hypodermic syringes.

A disposable hypodermic syringe includes a barrel open at one end with a cannula and hub attached at the opposite end. A plunger handle with a resilient piston member or stopper on one end is inserted into the barrel through the open end and is forced toward the cannula to inject the medicament. In manufacturing hypodermic syringes the plunger handle and stopper are connected in a subassembly, and this subassembly is inserted ino the barrel. Hand assembly of the stopper to the plunger handle is both tedious and costly.

Before the resilient stoppers can be mechanically attached to a plunger handle, they must be properly oriented. Heretofore, this orientation has been very difficult because of the shape of the stopper. The conventional stopper is generally cylindrical in shape with a closed forward end and an open rearward end to receive a portion of the plunger handle. Usually, two or more sealing rings are integrally molded to the outer surface of the cylindrical body to provide an adequate seal between the stopper and the syringe barrel. The stopper is usually about as wide as it is long, and the center of gravity is very near its geometrical center. Therefore, conventional orienting procedures cannot be used. My invention overcomes the difficulty in orienting these stoppers.

An object of this invention is to provide a machine for orienting certain types of small parts not suitable for conventional orienting procedures.

Another object of this invention is to provide a machine for orienting hypodermic syringe stoppers for assembly to plunger handles.

Still another object of this invention is to provide a simple machine for receiving randomly oriented hypodermic syringe stoppers in one end and expelling them at the other end in oriented alignment.

Other objects of this invention will become apparent from the following illustration and description of which:

Figure 1:
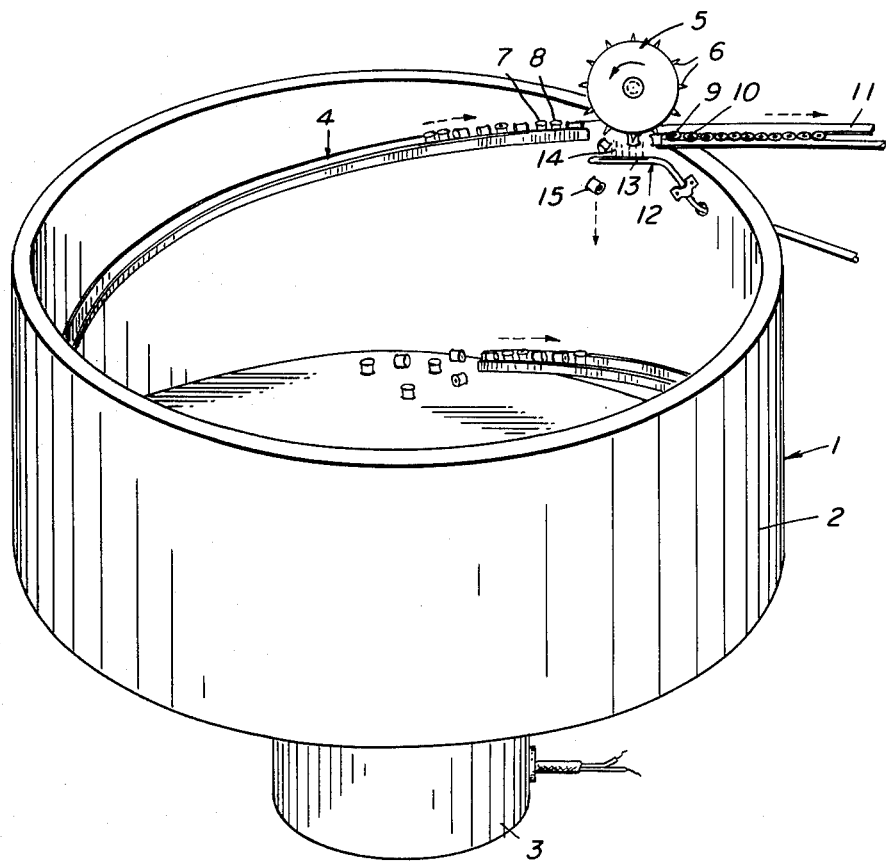
FIGURE 1 is a perspective view, partially cut away, of my orienting machine mounted on a conventional vibratory feeder.
Figure 3:
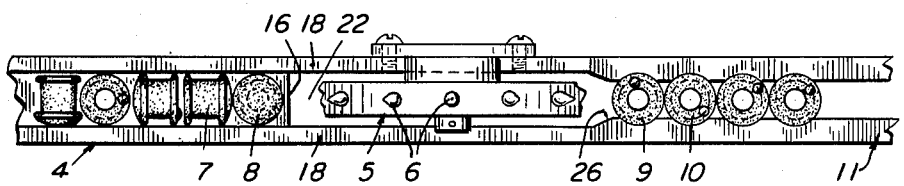
FIGURE 3 is a top plan view of the orienting machine.

My machine for orienting small parts is designed to be used in combination with a conventional vibratory feeder 1, as shown in FIGURE 1. This vibratory feeder 1 is generally comprised of a bowl 2 vibrated by motor 3. Inside bowl 2 is a spiral ramp or feed channel 4. As the bowl and feed channel vibrate, the small parts within the bowl are picked up and urged upwardly along the spiral feed channel 4. The spiral feed channel terminates near the upper lip of bowl 2, and it is here that my machine is attached to orient the small parts.

The spiral ramp or feed channel 4 is shown here as a generally U-shaped channel of dimensions sufficient to feed a single-file procession of nonoriented parts 7 and 8. The guide walls of the U-shaped feed channel continue over the side of bowl 2 and connect with an output channel 11. However, in FIGURE 1 the guide wall nearest the viewer has been cut away to more clearly show the lower part of carrier wheel 5. While the guide walls continue between the feed channel 4 and output channel 11 the floor of said feed channel 4 has been cut away to provide a slot-like opening beneath carrier wheel 5.

To prevent the stoppers from falling through the opening in the floor of channel 4, an air floor is provided by the upwardly directed air jet 14 emitted from slot 13 of air tube 12. Were it not for the air floor, all the stoppers as represented by numerals 7 and 8 would merely drop through the open floor section of feed channel 4 and fall back into bowl 2. With the air floor the stoppers are buoyed up against carrier wheel 5. Carrier wheel 5 is rotatably mounted above the air floor and contains about its periphery a series of spikes 6. These spikes 6 have the facility for rejecting or accepting a particular oriented stopper. If a stopper comes out of feed channel 4 with the plunger hole directed upwardly a spike 6 will fit into this hole and transfer the stopper across open floor section between channels 4 and 11. If the stopper is lying on its side or has its plunger hole directed downwardly, the spike 6 meeting this stopper as is comes off of feed channel 4 will reject it by crowding it off of the air floor and it will drop back into bowl 2, as illustrated by part 15. In FIGURE 1 carrier wheel 5 rotates counterclockdise, engaging only the hole-upward oriented stoppers, transferring them across the air floor and into output channel 11. Rotary motion is imparted to carrier wheel 5 by the parts themselves shooting out of feed channel 4. Each part, such as 7 or 8, is constantly pushing against the stopper ahead of it. The stoppers actually form a continuous, single file procession across the air floor and the stoppers push against spikes 6 and rotate carrier wheel 5. As an improperly oriented stopper is crowded out and shoved downwardly by a spike the next stopper immediately advances to take the place of the rejected stopper. Because vibrating motion is imparted to output channel 11 through its mechanical connection to bowl 2, the stoppers in this channel also tend to rotate carrier wheel 5 as they unload from spikes 6. If the particular parts are extremely light in weight and cannot rotate carrier wheel 5, an independent motor (not shown) can be used to rotate carrier wheel 5.

Figure 2:
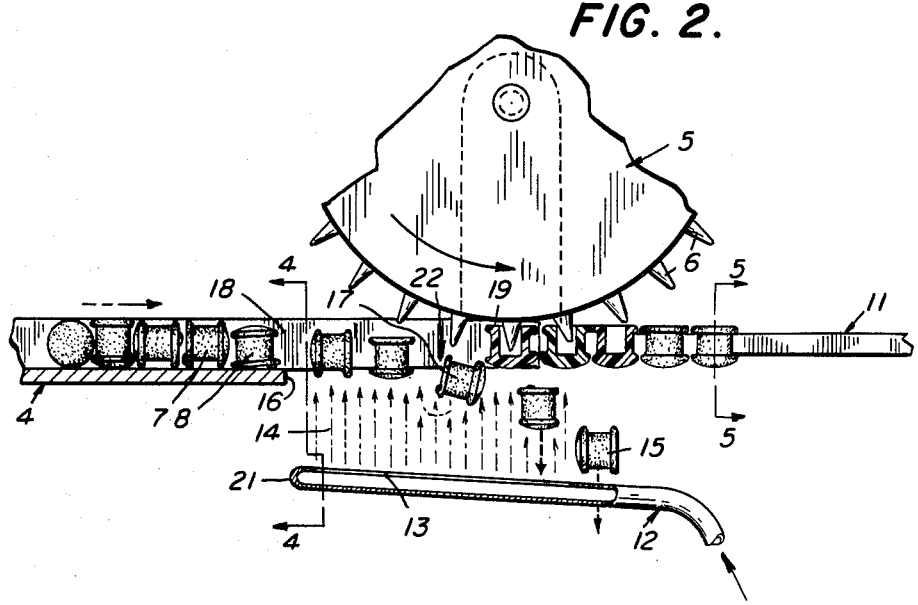
FIGURE 2 is a front elevational view partially in section of my orienting machine showing the cooperation between the air floor and the carrier wheel.

A larger view of the orienting machine is shown in FIGURE 2. One of the connecting guide walls 18 has been cut away to more clearly show the parts of the machine. The floor of feed channel 4 ends at 16 and the air floor proceeds therefrom to output channel 11. The opening in the floor of channel 4 is indicated by numeral 22. Stopper 19 is shown after it has been picked up by a spike 6 and is in the process of being carried across the air floor. Improperly oriented stoppers such as illustrated by stopper 15 are rejected by spikes 6 and crowded out to be recirculated through feed channel 4.

The air jet 14 coming from the slit 13 of air tube 12 having a closed end 21 is preferably turbulent. If the air jet is turbulent it will rotate some of the improperly oriented stoppers such as stopper 17. This stopper 17 can engage an empty spike 6 as it comes along. Depending on how a stopper is contacted by air jet 14 the stopper will either fall into bowl 2 as stopper 15 or rotated as stopper 17 and positioned on an empty spike. After the oriented stoppers pass the air floor 22 they are dropped off of spikes 6 and moved along channel 11 as represented by stoppers 9 and 10. Because the stoppers are transferred through the mouth 26 of the output channel 11 before they leave spikes 6 by output channel 11, a stopper can only enter the mouth of channel 11 if it is on a spike. All other stoppers make their exit underneath output channel 11 and fall back into bowl 2. Should a stopper get stuck on a spike, the bottom sealing ring 25 as in FIGURE 5 will catch underneath the output channel 11 and pull the stopper off the spike.

Figure 4:
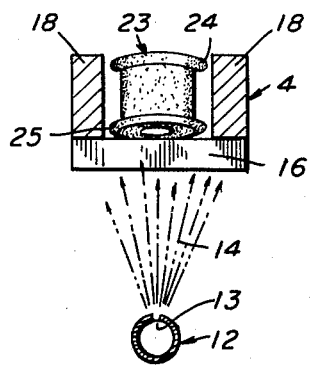
FIGURE 4 is a sectional view taken along the line 4—4 of FIGURE 2.

A typical stopper 23 with its sealing rings 24 and 25 is shown in FIGURE 4 as it proceeds along feed channel 4. As this stopper 23 moves toward the viewer it will reach floor end 16 of feed channel 4 and thereafter be buoyed up by air jet 14. Because this stopper 23 is properly oriented it will be engaged by a spike 6 and transferred across air floor 22.

Figure 5:
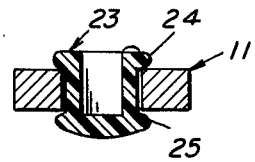
FIGURE 5 is a sectional view taken along line 5—5 of FIGURE 2.

When stopper 23 reaches the opposite side of the air floor it will go into output channel 11 shown in FIGURE 5. This output channel 11 is narrower than feed channel 4 so that it may contain the stoppers between sealing rings 24 and 25. These stoppers in output channel 11 proceed along in oriented, single-file fashion to a separate machine for attaching a plunger handle to each stopper.

Figure 6:
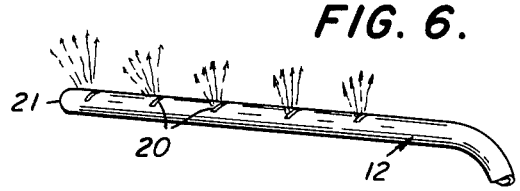
FIGURE 6 shows a modification of the air tube shown in FIGURE 2.

An alternative design for air tube 12 is shown in FIGURE 6. As in FIGURE 2, the air tube has a closed end 21. The slit 13, however, is replaced by a series of lateral slots 20. These slots 20 tend to give a more turbulent air flow to the air floor. Any number of a variety of slot configurations may be used in air tube 12 to provide a proper air floor for orienting a specific part.

In the foregoing description I have described certain embodiments of my invention. However, it is understood that certain modifications may be made by those skilled in the art without departing from the spirit and scope of my invention.

I claim:
1. A machine for orienting small parts comprising:
 (a) an air floor,
 (b) means for moving said parts single file across said air floor, and
 (c) a spiked carrier wheel rotatably mounted over said air floor, said carrier wheel being capable of engaging and transferring only oriented parts across the air floor.

2. A machine for orienting small parts comprising in combination:
 (a) a vibratory feeder having a feeder channel, said feeder channel having an open floor section at one end;
 (b) an output channel connected to the open floored end of said feeder channel;
 (c) means for blowing air into said open floor section to create an air floor, and
 (d) a carrier wheel rotatably mounted over said air floor, said carrier wheel having means to engage only properly oriented parts and to transfer them across the air floor to said output channel.

3. A machine for orienting small parts as set forth in claim 2 wherein said carrier wheel has a series of spikes on its periphery adapted to engage a hole in said parts.

4. A machine for orienting small parts as set forth in claim 2 wherein said carrier wheel is rotated by the continual movement of parts past said air floor.

5. A machine for orienting small parts, said machine adapted to be attached to the feed channel of a vibratory feeder and including in combination:
 (a) an output channel for carrying only oriented parts;
 (b) connecting means between said output channel and the feed channel of the vibratory feeder, said connecting means including guide walls and a slot-like bottom opening;
 (c) an air jet forming an air floor in said bottom opening; and
 (d) a carrier wheel rotatably mounted above said air floor and adapted to engage only properly oriented parts and transfer them across the bottom opening to said output channel.

6. A machine for orienting hypodermic syringe stoppers with a hole in one end comprising:
 (a) a single-file input feed channel for randomly oriented stoppers;
 (b) an output channel for properly oriented parts;
 (c) connecting means having an open floor between said input feed and said output channel;
 (d) a turbulent jet of air flowing upward through the open floor of said connecting means; and
 (e) a spiked carrier wheel rotatably mounted above the open floor of said connecting means and adapted to engage only the properly oriented stoppers from said input feed channel by inserting a spike of said carrier wheel in the hole of the stopper, transferring them across said open floor into said output channel.

7. A machine for orienting hypodermic syringe stoppers as set forth in claim 6 wherein said connecting means includes a guide wall on each side of said spiked carrier wheel, said guide walls acting to maintain said stoppers in a single-file path across air floor created by said turbulent air jet.

8. A machine for orienting hypoderimc syringe stoppers as set forth in claim 6 wherein said turbulent jet of air is introduced by a tube having a longitudinal slit for air passage, said tube having its end near said slit closed.

9. A machine for orienting hypodermic syringe stoppers as set forth in claim 6 wherein said turbulent jet of air is introduced by a tube having a series of short lateral slots for air passage, said tube having its end near said lateral slots closed.

10. A method of orienting small parts comprising:
 (a) feeding randomly disposed parts along an input channel;
 (b) moving said parts onto an air floor from said input channel;
 (c) engaging oriented parts and rejecting nonoriented parts from said air floor by means of a spiked wheel mounted over said air floor;
 (d) transferring the oriented parts by said spiked wheel to an output channel; and
 (e) recirculating the rejected parts in an randomly disposed manner to the input channel.

11. A method of orienting hypodermic syringe stoppers comprising:
 (a) feeding randomly disposed stoppers along an input channel toward the end of said channel;
 (b) supporting by means of an air floor the stoppers coming off of the end of said input channel;
 (c) guiding said stoppers across the air floor by guide walls positioned along each side of said air floor;
 (d) engaging oriented stoppers and rejecting nonoriented stoppers from said air floor by means of a spiked wheel mounted over said air floor;
 (e) transferring the oriented stoppers by said wheel to an output channel; and
 (f) recirculating the rejected parts in a randomly disposed manner to the input channel.

12. A method of orienting small parts comprising:
 (a) supporting randomly disposed small parts on an air floor created by an upwardly directed turbulent air jet;
 (b) engaging only oriented parts and transfering them across the air floor with a movable carrier means that rejects nonoriented parts; and
 (c) recirculating the rejected parts in a randomly disposed manner to the air floor.

13. A machine for orienting small randomly disposed parts comprising:
 (a) an air floor for buoyantly supporting said randomly disposed parts; and
 (b) carrier means above the air floor which rejects nonoriented parts and which engages only oriented parts transferring them across the air floor.

References Cited by the Examiner

UNITED STATES PATENTS 2,168,419  8/1939  Paterson.
3,012,651  12/1961  Hawkes _____ 198—33.1

FOREIGN PATENTS 460,901  9/1913  France.
954,333  4/1964  Great Britain.

EVON C. BLUNK, *Primary Examiner.*

RICHARD E. AEGERTER, HUGO O. SCHULZ,
*Examiners.*